United States Patent
Matsuda et al.

(10) Patent No.: US 9,158,738 B2
(45) Date of Patent: Oct. 13, 2015

(54) APPARATUS FOR MONITORING VICINITY OF A VEHICLE

(75) Inventors: Kodai Matsuda, Saitama (JP); Nobuharu Nagaoka, Saitama (JP); Hiroshi Hattori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 159 days.

(21) Appl. No.: 13/808,120

(22) PCT Filed: Jun. 15, 2011

(86) PCT No.: PCT/JP2011/003417
§ 371 (c)(1),
(2), (4) Date: Jan. 3, 2013

(87) PCT Pub. No.: WO2012/004938
PCT Pub. Date: Jan. 12, 2012

(65) Prior Publication Data
US 2013/0103299 A1    Apr. 25, 2013

(30) Foreign Application Priority Data
Jul. 9, 2010   (JP) .................................. 2010-156705

(51) Int. Cl.
*G06F 17/00* (2006.01)
*G06T 7/00* (2006.01)
(Continued)

(52) U.S. Cl.
CPC ............ *G06F 17/00* (2013.01); *G06K 9/00805* (2013.01); *G06K 9/00825* (2013.01);
(Continued)

(58) Field of Classification Search
CPC .......... G06K 9/00362; G06K 9/00369; G06K 9/00791; G06K 9/00805; G06K 9/3241; G06K 9/00825; G06T 2207/10048; G06T 2207/30196; G06T 2207/30252; G06T 7/0071; G06T 7/2006; G06T 2207/30261; B60R 2300/307; B60R 2300/8033; G01C 11/10; G06F 17/00; G08G 1/166
USPC .................................................. 701/300, 16

IPC ........ G06K 9/00791,9/3241, 9/00369, 9/00362, G06K 9/00805, 9/00825; G08G 5/02, 1/166; G05D 1/0676; B64D 45/04; B60R 2300/307, B60R 2300/8033; G06T 7/2006, 7/0071, G06T 2207/30252, 2207/30196, 2207/10048, G06T 2207/30261; G05F 17/00; G01C 11/10

See application file for complete search history.

(56) References Cited

U.S. PATENT DOCUMENTS

| | | |
|---|---|---|
| 2003/0007074 A1 | 1/2003 | Nagaoka et al. |
| 2007/0171033 A1 | 7/2007 | Nagaoka et al. |

(Continued)

FOREIGN PATENT DOCUMENTS

| | | |
|---|---|---|
| EP | 2 288 138 A1 | 2/2011 |
| JP | 2007-213561 A | 8/2007 |

(Continued)

OTHER PUBLICATIONS

Nagaoka et al., JP4271720 (Mar. 6, 2009) (Machine Translation).*

*Primary Examiner* — Calvin Cheung
*Assistant Examiner* — Courtney Heinle
(74) *Attorney, Agent, or Firm* — Carrier Blackman & Associates, P.C.; Joseph P. Carrier; Jeffrey T. Gadeon

(57) ABSTRACT

Category determination is performed on an object candidate extracted from a captured image after an exclusion process is performed in advance. In the exclusion process, a distance from a vehicle to the object candidate is calculated based on a size of the object candidate in a current image, a moved distance of the vehicle occurring in a time interval from a time a previous image was captured to a time the current image is captured is calculated, the size of the object candidate in the current image is decreased at a change ratio based on the distance to the object candidate and the moved distance, and a size of the object candidate in the previous image and a size of the object candidate decreased at the change ratio are compared. The object candidate with difference between them being determined to be larger than a predetermined value is removed.

10 Claims, 5 Drawing Sheets

(51) Int. Cl.
*G08G 1/16* (2006.01)
*G06K 9/00* (2006.01)

(52) U.S. Cl.
CPC .............. *G06T7/0071* (2013.01); *G08G 1/166* (2013.01); *G06T 2207/10048* (2013.01); *G06T 2207/30196* (2013.01); *G06T 2207/30261* (2013.01)

(56) References Cited

U.S. PATENT DOCUMENTS

2007/0269079 A1   11/2007   Taniguchi et al.
2007/0291987 A1   12/2007   Saka et al.
2008/0260207 A1   10/2008   Nagaoka et al.
2011/0064275 A1    3/2011   Nagaoka et al.

FOREIGN PATENT DOCUMENTS

| JP | 2008-113296 A | 5/2008 |
| JP | 4267657 B2 | 5/2009 |
| JP | 2009-193390 A | 8/2009 |
| JP | 2009-199138 A | 9/2009 |
| JP | 2009-265883 A | 11/2009 |
| JP | 2009-276200 A | 11/2009 |
| JP | 2009-276910 A | 11/2009 |

* cited by examiner

APPARATUS FOR MONITORING VICINITY OF A VEHICLE

TECHNICAL FIELD

The present invention relates to a device for monitoring the vicinity of a vehicle, and more specifically, relates to a device capable of removing things other than a desired object from object candidates in a captured image, using a moved distance of the vehicle in monitoring the vicinity of the vehicle.

BACKGROUND ART

Conventionally, there has been proposed a device which extracts various objects existing in the vicinity of a vehicle. Patent Literature 1 listed below discloses a method to mount a single infrared camera on a vehicle, to detect an object in the vicinity of a vehicle from an image captured by the camera, and to acquire a distance to the object based on a change ratio of a size of the object in the image.

CITATION LIST

Patent Literature

Patent Literature 1: Japanese Patent No. 4267657

SUMMARY OF INVENTION

Technical Problem

Conventionally, determination has been performed on a category of an object which is detected from an image captured by a camera or the like, that is, whether an object is a person such as a pedestrian or an artificial structural object such as a building. In general, since the determination includes image processing to evaluate shapes and features of an object and image processing to examine behaviors of the object by time-series tracking of the object, a calculation load is relatively high. When such a category determination process is performed on all detected objects, there will be a significant increase of the calculation load.

Further, when an object in a desired category is determined in the abovementioned category determination process, it is desirable to decrease, to the extent possible, a possibility that an object in another category is erroneously determined to be an object in the desired category. Particularly, when an object of the desired category is a pedestrian, it is desirable to decrease, to the extent possible, the possibility that an artificial structural object is erroneously determined to be a pedestrian.

Meanwhile, there has been performed to detect an object with a single camera mounted on a vehicle as disclosed in the abovementioned patent literature. Thus, cost can be reduced compared to a case of mounting a pair of cameras.

One object of the present invention is to propose a method to remove things which are not likely to be an object of a desired category by filtering detected object candidates from an image in advance to a category determination process described above and to decrease the possibility that an object in another category is erroneously determined to be an object of the desired category while decreasing the load of subsequent image processing. In particular, the possibility is decreased that an artificial structural object is erroneously determined to be a pedestrian when the desired category is a pedestrian. Further, another object of the present invention is to propose a method capable of performing a filtering process described above easily and effectively with the use of a single camera.

Solution to Problem

According to an aspect of the invention, a device for monitoring vicinity of a vehicle as being mounted on the vehicle, includes an imaging device which captures an image of the vicinity of the vehicle, and an extracting device which extracts an object candidate existing outside the vehicle based on the captured image. It further includes a removing device which removes an object candidate determined to have a low possibility of being an object candidate of a desired category from the extracted object candidates, and a category determining device which determines whether or not the object candidate is an object of the desired category with respect to each remaining object candidate after the exclusion. The removing device further includes a device to calculate a distance (Z0) from the vehicle to the object candidate based on a size (Ghd0) of the extracted object candidate in the current image assuming that the extracted object candidate has a predetermined size which is previously set for an object candidate of the desired category, a device to calculate a moved distance ($\Delta Z$) of the vehicle in the time interval from a time a previous image was captured to a time the current image is captured, a device to decrease the size of the object candidate in the current image at a change ratio based on the calculated distance to the object candidate and the calculated moved distance, a comparing device to compare a size (Ghd1) of the object candidate in the previous image with a size (Ghv) of the object candidate decreased at the change ratio, and a device to remove the object candidate having a low possibility of being an object candidate of the desired category when the comparing device determines that size difference of the object candidate is larger than a predetermined value and that, therefore, the object candidate has a low possibility of an object candidate of the desired category.

According to another aspect of the invention, the removing device includes a device to calculate a distance (Z1) from the vehicle to the object candidate based on a size (Ghd1) of the extracted object candidate in the previous image assuming that the extracted object candidate has a predetermined size which is previously set for an object candidate of the desired category, a device to calculate a moved distance ($\Delta Z$) of the vehicle occurring in a time interval from a time a previous image was captured to a time the current image is captured, a device to enlarge the size of the object candidate in the previous image at a change ratio that is based on the calculated distance to the object candidate and the calculated moved distance, a comparing device to compare a size (Ghd0) of the object candidate in the current image and a size (Ghv) of the object candidate enlarged at the change ratio, and a device to remove the object candidate having a low possibility of being an object candidate of the desired category when the comparing device determines that size difference of the object candidate is larger than a predetermined value and that, therefore, the object candidate has a low possibility of an object candidate of the desired category.

According to the above inventions, on the premise that the moved distance of a vehicle under assumption that the object candidate extracted from the image has a size which is previously set for the object of the desired category, whether or not the object candidate in the image corresponds to an object of the desired category is ascertained and filtered based on the moved distance. When the object candidate in the image does not actually represent an object of the desired category, the abovementioned assumption is not satisfied, and difference of the size of the object candidate, a result of comparison, becomes large and the object candidate may be removed. This filtering process only requires evaluating the size of the object in the image and will not require a complicated process such as evaluation of characteristics of the shape and time-series behaviors of the object, and accordingly, things other than objects of the desired category may be removed by simple calculation. As an object candidate that becomes a possible noise in the subsequent category determination process may be removed, the calculation load of the category determination may be decreased and reduction of erroneous determination of the category may be achieved. For example, when the object of the desired category is a pedestrian, the possibility that an object in another category such as an artificial structural object is erroneously determined to be a pedestrian may be reduced.

According to an embodiment of the invention, the imaging device may be a single infrared camera, and the extracting device extracts a high-luminance area obtained by binarizing an image obtained from the single infrared camera as the object candidate.

According to the present invention, since only one camera is required, cost can be reduced. Further, since binarization is performed on an image from an infrared camera, an object candidate which has relatively high temperature like a pedestrian, for example, may be easily extracted.

Other features and advantages of the present invention will become apparent from the following detailed description.

DETAILED DESCRIPTION

Figure 1:
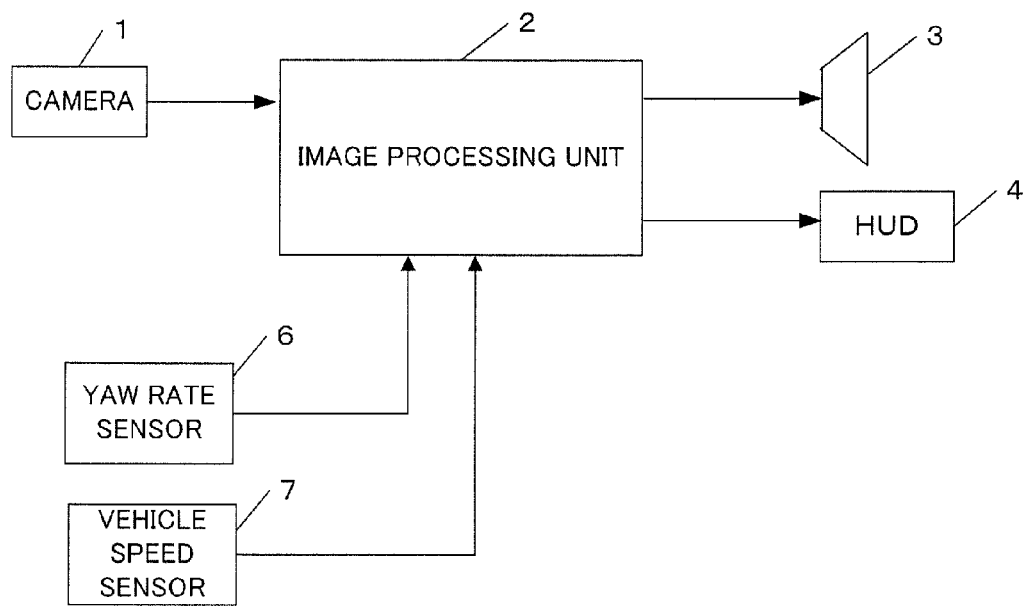
FIG. 1 is a block diagram illustrating a structure of a device for monitoring the vicinity of a vehicle according to an embodiment of the present invention.

In the following, embodiments of the present invention will be described with reference to the drawings. FIG. 1 is a block diagram illustrating a structure of a device for monitoring the vicinity of a vehicle according to an embodiment of the present invention. The device is mounted on the vehicle and is provided with one infrared camera 1 which may detect far infrared rays, and an image processing unit 2 which detects an object at the vicinity of the vehicle based on image data captured by the camera 1 and which determines a category. The device is further provided with a speaker 3 which raises an audio alarm based on a result of the category determination, and a head-up display (hereinafter, called an HUD) 4 which displays alarm notice based on the result of the category determination while displaying the image obtained with imaging of the camera 1. Further, the vicinity monitoring device is provided with a yaw ratio sensor 6 which detects a ycw yaw ratio of the vehicle, and with a vehicle speed sensor 7 which detects driving speed (vehicle speed) of the vehicle. Detection results of the above sensors are sent to the image processing unit 2 and used for predetermined image processing as required.

Figure 2:
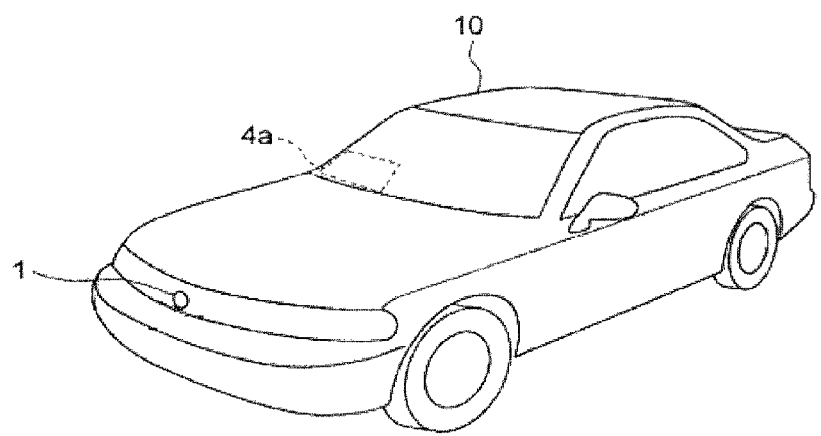
FIG. 2 is a view illustrating an attaching position of a camera according to an embodiment of the present invention.

In the present embodiment, the camera 1 is provided at a front part of the vehicle 10 on a center axis passing through the center of vehicle width to capture an image of the front from the vehicle 10, as illustrated in FIG. 2. The infrared camera 1 has a characteristic that an output signal level thereof is increased (i.e., luminance is increased in a captured image) with increase of temperature of an object.

The image processing unit 2 includes an A/D conversion circuit which converts an input analog signal into a digital signal, an image memory which stores a digitalized image signal, a central processing unit (CPU) which performs a variety of calculation processes, a random access memory (RAM) which is used for storing data when the CPU performs calculation, a read only memory (ROM) which stores a program to be performed by the CPU and data (including tables and maps) to be used therefor, and an output circuit which outputs a drive signal to the speaker 3 and a display signal to the HUD 4. An output signal of the camera 1 is converted into a digital signal and input to the CPU. As illustrated in FIG. 2, the HUD 4 is provided so that a screen 4a is displayed at a front position from a driver at a front window of the vehicle 10. Thus, the driver can visually recognize the screen displayed on the HUD 4.

Here, a display unit attached to a dashboard, for example, may be adopted instead of the HUD 4. For example, a display unit of a so-called navigation system (not illustrated) may be used. The navigation system may detect a current position of the vehicle and compute an appropriate route to a destination, and may display them on a map.

Figure 3:
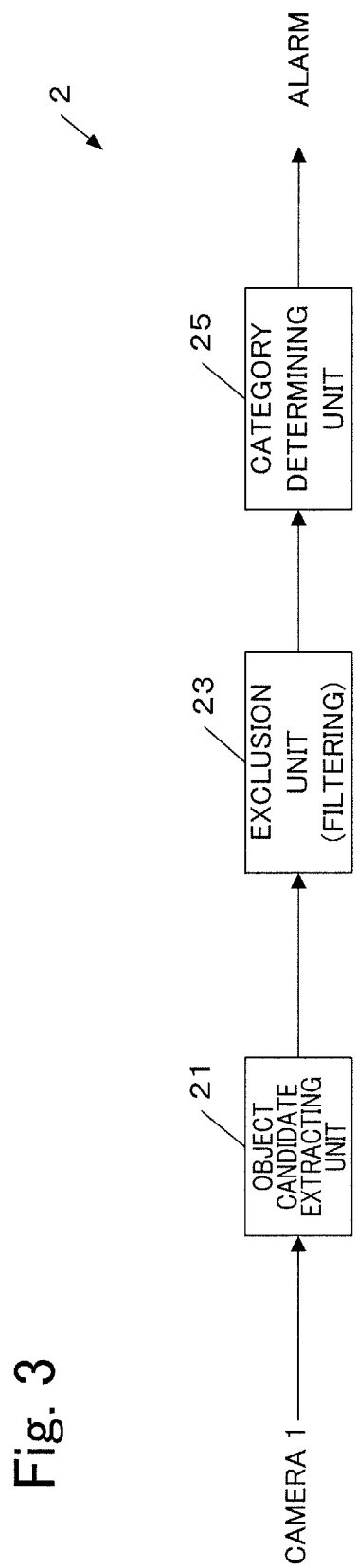
FIG. 3 is a functional block diagram of an image processing unit according to an embodiment of the present invention.

FIG. 3 illustrates a functional block diagram of the image processing unit 2 according to an embodiment of the present invention.

An object candidate extracting unit 21 obtains an image captured by the camera 1 and extracts an image area of an object candidate from the image. As described above, in the present embodiment, since the image captured by the camera 1 is a gray-scale image having luminance values corresponding to temperature of an imaged object, the extraction is achieved based on the luminance values of the gray-scale image. Specifically, in the captured image, an image area having a higher luminance value than a predetermined luminance threshold value ITH is extracted as an object candidate. With this extraction process, an object which has relatively high temperature like a living body may be extracted. But, an artificial structural object may also be extracted when it has a heat source, for example.

Conventionally, a category determination process indicated by a functional block 25 is performed on the object candidate extracted as described above. The category determination process is a process to eventually determine what object category an object candidate belongs to. Examples of the categories include a pedestrian (person) and an artificial structural object. The determination process can specify whether the object candidate is a pedestrian or an artificial structural object, or the like. Since an alarm is issued based on a result of the category determination, in general, relatively high accuracy is required for such a category determination process. Accordingly, it is often required to examine the shape of the object candidate in the image and the behavior of the object candidate in time-series images. Thus, the category determination process has a relatively high calculation load. For example, in a case of determining on a pedestrian, the process is performed to determine whether or not characteristics of the shape unique to a pedestrian are extracted. Examples include a process to determine whether or not a circular shape indicating a head part is be detected from the object candidate. The examples also include a process to determine whether or not a predetermined high-luminance area is be detected for each body unit (a head part, a body part, a leg part and the like) of a person. Further, a process may be performed to determine whether or not a behavior that a pedestrian is walking is detected from the behaviors of the object candidate in the time-series images. When such a category determination process is finely performed for each extracted object candidate, the calculation load may be too large.

In the present invention, an exclusion processing unit (filtering unit) 23 is provided between the object candidate extracting unit 21 and a category determining unit 25. The exclusion processing unit 23 has a function to roughly (coarsely) perform filtering on extracted object candidates in advance to the category determination process. The exclusion processing unit 23 removes an object candidate which has a low possibility of being an object candidate in a desired category from the subsequent category determination process. Accordingly, an object candidate that will become a noise in the category determination process can be removed in advance. The "desired category" is previously determined and is a pedestrian (person) in the present embodiment. As described above, the subsequent category determining unit 25 eventually determines whether or not an object candidate is an object in the desired category, that is, is a pedestrian, for each of the object candidates which are not removed by the exclusion processing unit 23. In a case of being determined as a pedestrian eventually, an alarm for informing a driver of existence of the pedestrian is raised via the speaker 3 and/or the HUD 4.

Since the exclusion processing unit 23 focuses attention only on a size of an object candidate not on features in shape of the object candidate and time-series behaviors, selection of the object candidates can be performed with simple calculation. Therefore, the calculation load of the entire image processing can be decreased by providing the exclusion processing unit 23. Further, since object candidates that are not removed by the exclusion processing unit 23 have a likelihood of being an object of the desired category, erroneous determination by the category determining unit 25 may be decreased. For example, when the object of the desired category is a pedestrian as described above, the possibility of determining an artificial structural object as a pedestrian by mistake may be decreased.

In the following embodiments, as described above, the desired category is a pedestrian, the exclusion processing unit 23 removes an object candidate which is determined to have a low possibility of being a pedestrian, and the category determining unit 25 eventually determines whether or not each object candidate remaining after the exclusion is a pedestrian. The category determination process for pedestrians may also use a known method, for example, the method disclosed in Japanese Patent Application Laid-Open (JP-A) Nos. 2007-241740, 2007-264778, 2007-334751, and others may be used. Further, in addition to the determination on a pedestrian, the category determination process may include determination on an artificial structural object and determination on an animal. Accordingly, whether a category of an object candidate which is not determined as a pedestrian is an artificial structural object, an animal or the like may be determined. In this case, for example, the category determination process for an artificial structural object may use a method disclosed in JP-A Nos. 2003-016429, 2008-276787, and others. Further, for example, the category determination process for an animal may use a method disclosed in Japanese Patent Application Publication No. 2007-310705, Japanese Patent Application Publication No. 2007-310706 and others.

Figure 4:
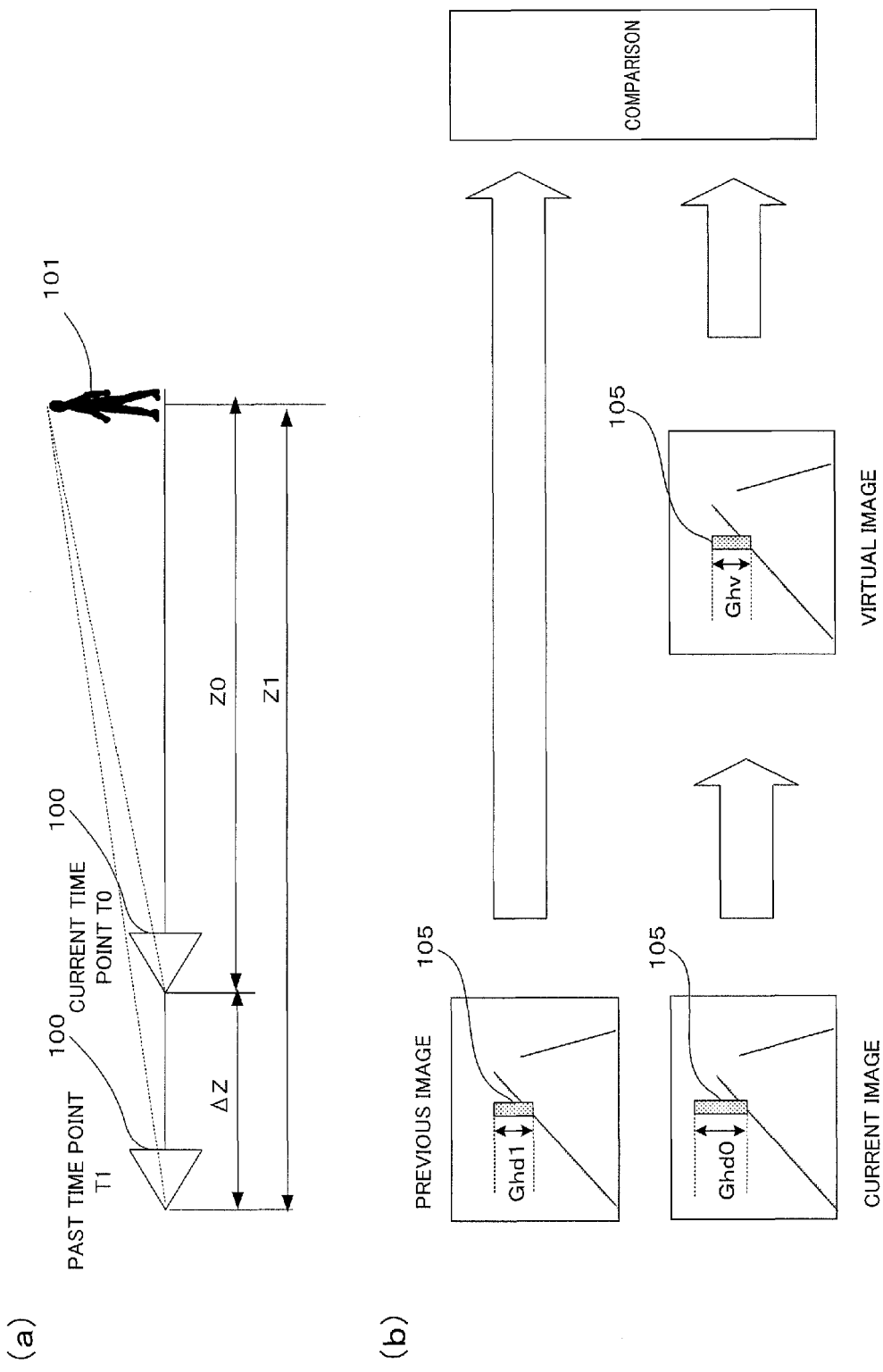
FIG. 4(a) is a view illustrating a relation in a distance direction between a vehicle and an object at previous and current time points and FIG. 4(b) is a view conceptually illustrating a comparison process between a previous image and a virtual image generated from a current image according to an embodiment of the present invention.

Next, a specific filtering method with the exclusion processing unit 23 is described with reference to FIG. 4. FIG. 4(a) is a view illustrating a relation in a distance direction between an own vehicle and an object at a previous time point t1 and a current time point t0. A user's own vehicle 100 is indicated by a triangle. An object 101, a pedestrian, is located ahead of the vehicle 100 and is imaged by the camera 1 mounted on the vehicle 100.

A distance from the vehicle 100 to the object 101 is Z1 at the previous time point t1 and a distance from the vehicle 100 to the object 101 is Z0 at the current time point t0. The vehicle 100 runs between the previous time point t1 and the current time point t0 and a moved distance thereof is indicated by ΔZ. The moved distance ΔZ can be calculated by multiplying a time interval (t0−t1) between the time points t1, t0 by a speed Vs of the vehicle 100 (detected by the vehicle speed sensor 7).

FIG. 4(b) schematically illustrates an image (called a previous image) captured by the camera 1 at the previous time point t1 in FIG. 4(a) and an image (called a current image) captured by the camera 1 at the current time point t0. Here, it is assumed that an object candidate 105 being a high-luminance area is extracted from the previous image and the current image by the object candidate extracting unit 21.

In FIG. 4(a), a pedestrian is illustrated as the object 101. However, it should be noted that, at the time of the extraction, the image processing unit 2 is not sure whether or not the object candidate 105 is the pedestrian 101.

A height of the object candidate 105 in the previous image is Ghd1 (e.g., capable of being indicated by the number of pixels, being the same hereinafter) and a height of the object candidate 105 in the current image is Ghd0. Since the vehicle 100 at the current time point t0 is closer to the object 101 than at the previous time point t1 as illustrated in FIG. 4(a), the height Ghd0 in the current image is larger than the height Ghd1 in the previous image.

Here, it is assumed that the extracted object candidate has a predetermined size H which is previously set for an object of the desired category. In the present embodiment, a pedestrian is eventually determined as the object of the desired category in the image. Therefore, the predetermined size is set for a pedestrian. (In this example, it is assumed that a standing height is 170 cm. Instead, a mean standing height of the adults may be used.) Further, it is assumed that the object candidate 105 extracted from the image as described above has the predetermined size H in the real space.

According to the above assumption (hypothesis), the distance Z0 from the vehicle 100 to the object 101 corresponding to the object candidate 105 having the height Ghd0 in the current image can be calculated as follows. Here, "f" denotes a focal distance of the camera 1 and "H" denotes the predetermined size (standing height in the present embodiment) under the above assumption.

$$Z0 = (H \times f)/Ghd0 \qquad (1)$$

If the object candidate 105 actually represents a pedestrian, the distance Z0 calculated as described above is supposed to be a right value. To verify the correctness, a virtual image is generated by estimating, based on the current image, in what size the object would have been imaged at the previous time point t1.

That is, the height Ghv of the object to be imaged in the image when the vehicle 100 moves back by distance ΔZ from the current time point t0 is calculated from the current image. Since the distance to the object at the previous time point t1 is Z1 as illustrated in FIG. 4(a), the height Ghv relates to the ratio of the previous distance Z1 and the current distance Z0. Here, the previous distance Z1 is Z1=Z0+ΔZ. Accordingly, the height Ghv can be calculated as follows.

$$Ghv=Ghd0\times(Z0/(Z0+\Delta Z)) \quad (2)$$

Since the ratio of the distance (Z0/(Z0+ΔZ)) is smaller than 1, the height Ghv of the object candidate 105 in the virtual image is smaller than the height Ghd0 of the object candidate 105 in the current image.

When the object candidate 105 actually represents a pedestrian, the above assumption is correct (the distance Z0 of expression (1) is correct, accordingly). The height Ghv of the object candidate 105 in the virtual image is equal approximately to the height Ghd1 of the object candidate 105 in the previous image actually obtained at the previous time point t1. Therefore, as illustrated by a comparison block in FIG. 4(b), comparison is performed between the height Ghd1 of the object candidate 105 in the previous image and the height Ghv of the object candidate 105 in the virtual image. When the difference between them is larger than a predetermined threshold value, it is determined that the abovementioned assumption, that is, the assumption that the extracted object candidate 105 has a size corresponding to a pedestrian in the real space, is wrong. Accordingly, the object candidate 105 is determined to have a low possibility of representing a pedestrian. Then, the object candidate 105 is removed from the category determination process by the subsequent category determining unit 25. On the other hand, when the difference between them is equal to or smaller than the threshold value, it is determined that the abovementioned assumption is correct. Accordingly, the object candidate 105 is determined to have a possibility of representing a pedestrian. Here, the object candidate 105 proceeds to the subsequent category determining unit 25, and then, eventual determination is performed whether or not the object candidate 105 is a pedestrian.

In this manner, the exclusion processing unit 23 can remove (perform filtering of) an object candidate which cannot be an object of the desired category (a pedestrian in the present embodiment) in advance to the category determination process which has a relatively high calculation load. Accordingly, a possibility of erroneous determination in the subsequent category determination process, that is, erroneous determination of an artificial structural object as a pedestrian in the present embodiment is decreased. Since the filtering process can be achieved with simple calculation as described above, it is considered to be a remarkably effective process for selecting processing objects in advance for the category determination process.

Figure 5:
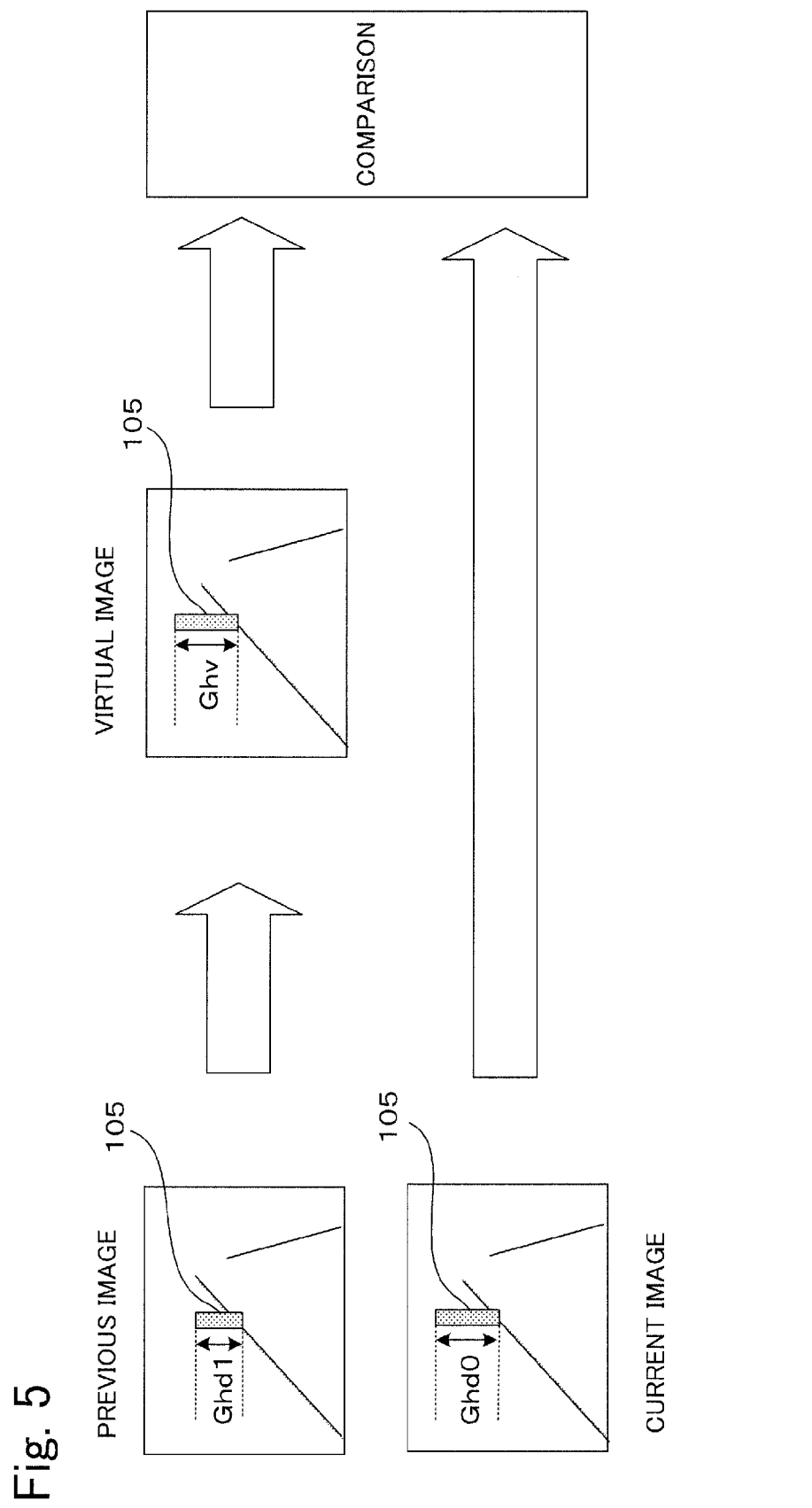
FIG. 5 is a view conceptually illustrating a comparison process between a current image and a virtual image generated from a previous image according to an embodiment of the present invention.

In the embodiment of FIG. 4(b), the virtual image is generated from the current image and is compared to the previous image. Alternatively, it is also possible to generate the virtual image from the previous image and to compare the virtual image to the current image. The alternative embodiment is illustrated in FIG. 5.

In the alternative embodiment, the distance relation of FIG. 4(a) is similarly applied as well. Further, the abovementioned assumption (hypothesis) is also the same in the alternative embodiment. According to the assumption, a distance Z1 from the vehicle 100 to the object 101 corresponding to the object candidate 105 having a height Ghd1 in the previous image can be calculated as follows. Here, "f" denotes a focal distance of the camera 1 and "H" denotes the predetermined size (standing height in the present embodiment) under the above assumption.

$$Z1=(H\times f)/Ghd1 \quad (3)$$

If the object candidate 105 actually represents a pedestrian, the distance Z1 calculated as described above is correct. To verify it, a virtual image is generated from the previous image by estimating size of the object imaged at current time t0.

That is, estimation is performed from the previous image for a height Ghv of the object to appear in an image when the vehicle is advanced by the moved distance ΔZ from the previous time point t1. Since the distance of the object at the current time point t0 is Z0 as illustrated in FIG. 4(a), the height Ghv relates to the ratio of the previous distance Z1 and the current distance Z0. Here, the current distance Z0 is Z0=Z1−ΔZ. Accordingly, calculation can be performed as follows.

$$Ghv=Ghd1\times(Z1/(Z1-\Delta Z)) \quad (4)$$

Since the ratio corresponding to the distances (Z1/(Z1−ΔZ)) is larger than 1, the height Ghv of the object candidate 105 in the virtual image is enlarged relative to the height Ghd1 of the object candidate 105 in the previous image.

When the object candidate 101 actually represents a pedestrian as described above, the above assumption becomes right (the distance Z1 of expression (3) becomes right, accordingly). The height Ghv of the object candidate 105 in the virtual image is equal approximately to the height Ghd0 of the object candidate 105 in the current image actually obtained at the current time point t0. Therefore, as illustrated by a comparison block in FIG. 5, comparison is performed between the height Ghd0 of the object candidate 101 in the current image and the height Ghv of the object candidate 101 in the virtual image. When the difference between them is larger than a predetermined threshold value as a result of the comparison, it is determined that the abovementioned assumption, that is, the assumption that the extracted object candidate 105 has a size corresponding to a pedestrian in the real space, is wrong. Accordingly, the object candidate 101 is determined to have a low possibility of representing a pedestrian. Then, the object candidate 105 is removed from the category determination process by the subsequent category determining unit 25. On the other hand, when the difference between them is equal to or smaller than the threshold value, it is determined that the abovementioned assumption is right. Accordingly, the object candidate 105 is determined to have a possibility of representing a pedestrian. Here, the object candidate 105 is passed to the subsequent category determining unit 25, and then, eventual determination is performed whether or not the object candidate 105 is a pedestrian. In this alternative embodiment, it is also possible to obtain effects similar to those described above with reference to FIG. 4(b).

Figure 6:
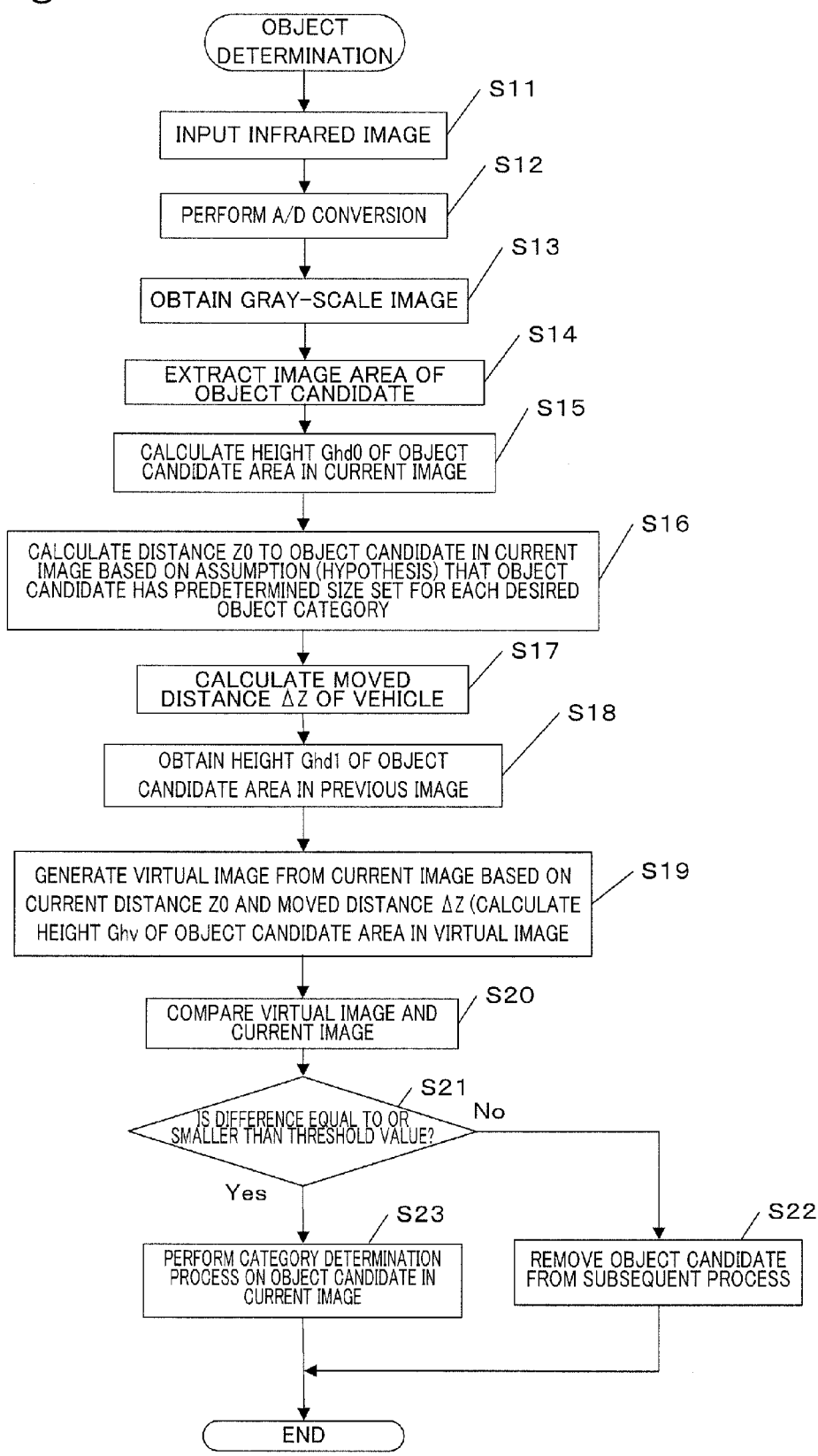
FIG. 6 is a flowchart of a determination process of an object according to an embodiment of the present invention.

FIG. 6 is a flowchart describing a process which is performed by the image processing unit 2 according to an embodiment of the present invention. The process is performed at predetermined time intervals. The process is based on the embodiment of FIG. 4(b) and the object of the desired category to be eventually determined is a pedestrian (person).

In steps S11 to S13, output signals (i.e., captured image data) from the camera 1 are received as input and are stored in an image memory after A/D conversion. The image data to be stored is a gray-scale image including luminance information.

In step S14, an image area representing an object candidate is extracted from the image captured by the camera 1. As described above, this can be performed by binarizing the image, for example.

Specifically, a process is performed so that a brighter area than a luminance threshold value ITH is set to "1 (while)" and a darker area is set to "0 (black)". With this binarization process, an object having higher temperature than predetermined temperature is extracted as a white area. The luminance threshold value ITH may be determined with a conventional method. The binarized image data is converted into run length data. That is, the run length data of the white area by binarization is represented by coordinates of a starting point (a pixel at a left end of each line) of the white area of each pixel row (called a line) and a length (indicated by the number of pixels) from the start point to an end point (a pixel at a right end of each line). Here, y-axis denotes the vertical direction of the image and x-axis denotes the horizontal direction. For example, when a white area on a pixel row with y1 in y-coordinate is a line from (x1, y1) to (x3, y1), the line has three pixels and is represented by run length data (x1, y1, 3). Subsequently, labeling of the object is performed and the process to extract the object is performed. That is, lines that are successive in y-direction out of the lines represented by run length data are assumed to belong to a single object and a label is added thereto. In this manner, an image area of an object candidate is extracted.

In step S15, the height Ghd0 of the object candidate extracted as described above is calculated on an image captured at this time, that is, the current image. The above calculation can be performed as a length (indicated by the number of pixels), in the height direction (y-direction), of the image area extracted as the object candidate as described above. The calculated height is stored in a memory.

In step S16, the distance Z0 in the real space to the object candidate in the current image is estimated under the assumption that the extracted object candidate has a predetermined size previously set for an object of the desired category. In the present embodiment, since the object in the desired category is a pedestrian, the distance Z0 can be estimated by substituting a standing height value previously set for a pedestrian into H of the above mentioned formula (1).

In step S17, the moved distance ΔZ of the vehicle from the previous time point (in the present embodiment, the time point the previous process cycle is executed, that is, the time point the previous image is obtained) to the current time point is calculated. The above calculation can be performed by multiplying the time interval of executing the process, that is a time interval Δt for obtaining an image captured by the camera 1, by the speed Vs of the vehicle detected by the vehicle speed sensor 7.

In step S18, the height GHd1 of the image area extracted as the object candidate is obtained on the image obtained in the previous cycle (called the previous image). This height may be obtained from that calculated and stored in a memory in step S15 when the process is executed in the previous cycle.

In step S19, the virtual image is generated from the current image based on the distance Z0 and the moved distance ΔZ calculated in steps S16 and S17. Specifically, according to the above mentioned formula (2), the height Ghv of the object candidate to be obtained in the previous image is calculated by multiplying the height Ghd0 in the current image with the ratio (change ratio) Z0/(Z0+ΔZ) which corresponds to the distance.

In step S20, the height Ghd1 of the object candidate in the previous image and the height GHv of the object candidate in the virtual image are compared and difference between them is calculated.

In step S21, determination is performed whether or not the difference is equal to or smaller than a predetermined threshold value. The threshold value may be previously determined in consideration of allowable errors. For example, it may be determined based on a degree of allowance as errors of the standing height.

When the difference is larger than the predetermined threshold value, ("No" in step S21), it is determined that the abovementioned assumption (hypothesis) that the object candidate in the image has a size corresponding to the object in the desired category is wrong and that the image area extracted as the object candidate in step S14 has a low possibility of indicating a pedestrian. Then, the object candidate is removed from the subsequent category determination process in step S22.

On the other hand, when the difference is equal to or smaller than the predetermined threshold value ("Yes" in step S21), it is determined that the abovementioned assumption is right and that the image area extracted as the object candidate in step S14 has a possibility of representing a pedestrian. Accordingly, in step S23, the category determination process is performed on the object candidate to eventually determine whether or not the object candidate is a pedestrian. As described above, in the category determination process, it is possible to determine whether or not the object candidate is a pedestrian, for example, by evaluating characteristics of the shape of the object candidate, time-series behaviors or the like according to a conventional method. When the object candidate is determined as being a pedestrian, an alarm may be issued via the speaker 3 or the HUD 4 for notifying the driver of existence of the pedestrian.

The process described in FIG. 6 may be applied similarly to the embodiment described with reference to FIG. 5. In this case, the height Ghd1 of the object candidate in the previous image extracted in the previous cycle is obtained in step S15. The distance Z1 to the object candidate in the previous image is calculated in step S16 according to expression (3) described above. The height Ghd0 of the object candidate in the current image is calculated in step S18. The virtual image is generated from the previous image in step S19. Specifically, according to expression (4), the height Ghv of the object candidate in the virtual image is calculated based on the distance Z1 and the moved distance ΔZ. In step S20, the height Ghv of the object candidate in the virtual image and the height Ghd0 of the object candidate in the current image are compared and difference between them is determined whether or not being equal to or smaller than a predetermined value.

In the above embodiments, the object in the desired category is assumed to be a pedestrian (person). For example, it is also possible that the desired category is further classified into adults and children and that the abovementioned exclusion process is performed for each category. In this case, for the category of adults, the predetermined size H may denote a mean standing height value of adults, for example. For the category of children, the predetermined size H may denote a mean standing height value of children at predetermined age, for example. The category determination process for a pedestrian is performed on an object candidate which is not removed in neither of the exclusion processes. Further, not limited to a pedestrian, an object of a desired category may be a predetermined animal (e.g., a four-footed animal such as a bear and a deer).

Further, in the abovementioned embodiment, the predetermined size H denotes a size in the height (vertical) direction. For a pedestrian, as the height direction is used, the abovementioned exclusion process can be performed more accurately regardless of orientation of the pedestrian to the vehicle. However, a size in the height direction may not necessarily be used. A size in the width (horizontal) direction may also be used alternatively. This is because a width of an object candidate in a captured image changes as well according to the distance. For example, the abovementioned exclusion process may be used under assumption (hypothesis) that an object candidate extracted from a captured image has a predetermined width W which is previously set for an object of the desired category.

Further, in the abovementioned embodiments, an infrared camera is used as the camera so that an object such as a living body having relatively high temperature can be easily extracted accordingly. However, alternatively, a visible ray camera may be used. In this case, an image area of an object candidate may be extracted from the captured image with an arbitral and appropriate method and the exclusion process may be performed as described above on the extracted object candidate.

In the above, description is performed on specific embodiments of the present invention. However, the present invention is not limited to these embodiments.

REFERENCE SIGNS LIST 1R, 1L Infrared camera (Imaging means)
2 Image processing unit
3 Speaker
4 HUD

The invention claimed is:

1. An apparatus mounted on a vehicle for monitoring vicinity of the vehicle, comprising:
   imaging means for capturing a time series of images of the vicinity of the vehicle;
   extracting means for extracting an object candidate from the captured time series of images;
   means for calculating distance (Z0 or Z1) from the vehicle to the object candidate at one point of time from the image captured at the one point of time under the assumption that the extracted object candidate has a size which is predetermined for an object of a desired category, and calculating distance (Z0 or Z1) from the vehicle to the object candidate at an other point of time on the basis of a velocity of the vehicle and the distance (Z0 or Z1) at the one point of time;
   means for producing a virtual object which has a size (Ghv) determined by multiplying the size (Ghd0 or Ghd1) of the object candidate in the image captured at the one point of time by a ratio of the distance at the one point of time and the other point of time;
   comparing means for generating a comparison of the size (Ghv) of the virtual object with the size (Ghd1 or Ghd0) of the object candidate in the image captured at the other point of time; and
   means for determining that the extracted object candidate is an object of the desired category if the comparison substantially matches.

2. The apparatus of claim 1, further comprising:
   means for removing the object candidate whose size does not match the size of the virtual object from further processing.

3. The apparatus of claim 1, wherein the means for determining determines that the comparison substantially matches if the comparison falls within a predetermined error range.

4. The apparatus of claim 1, wherein the desired category of object is a human and the predetermined size is an average size of a human.

5. An apparatus mounted on a vehicle for monitoring vicinity of the vehicle, the apparatus having an image processing unit including a processor and a memory, and a imaging device for capturing a time series of images of the vicinity of the vehicle, the image processing unit being configured to:
   extract an object candidate from the captured time series of images;
   calculate distance (Z0 or Z1) from the vehicle to the object candidate at one point of time from the image captured at the one point of time under the assumption that the extracted object candidate has a size which is predetermined for an object of a desired category, and calculate distance (Z0 or Z1) from the vehicle to the object candidate at an other point of time on the basis of a velocity of the vehicle and the distance (Z0 or Z1) at the one point of time;
   produce a virtual object which has a size (Ghv) determined by multiplying the size (Ghd0 or Ghd1) of the object candidate in the image captured at the one point of time by a ratio of the distance at the one point of time and the other point of time;
   generate a comparison of the size (Ghv) of the virtual object with the size (Ghd1 or Ghd0) of the object candidate in the image captured at the other point of time; and
   determine that the extracted object candidate is an object of the desired category if the comparison substantially matches.

6. The apparatus of claim 5, wherein the image processing unit is further configured to remove the object candidate whose size does not match the size of the virtual object from further processing.

7. The apparatus of claim 5, wherein the image processing unit determines that the comparison substantially matches if the comparison falls within a predetermined error range.

8. The apparatus of claim 5, wherein the desired category of object is a human and the predetermined size is an average size of a human.

9. A method for monitoring vicinity of a vehicle, comprising:
   capturing a time series of images of the vicinity of the vehicle;
   extracting an object candidate from the captured time series of images;
   calculating distance (Z0 or Z1) from the vehicle to the object candidate at one point of time from the image captured at the one point of time under the assumption that the extracted object candidate has a size which is predetermined for an object of a desired category, and calculating distance (Z0 or Z1) from the vehicle to the object candidate at an other point of time on the basis of a velocity of the vehicle and the distance (Z0 or Z1) at the one point of time;
   producing a virtual object which has a size (Ghv) determined by multiplying the size (Ghd0 or Ghd1) of the object candidate in the image captured at the one point of time by a ratio of the distance at the one point of time and the other point of time;

generating a comparison of the size (Ghv) of the virtual object with the size (Ghd1 or Ghd0) of the object candidate in the image captured at the other point of time; and determining that the extracted object candidate is an object of the desired category if the comparison substantially matches.

10. The method of claim 9, further comprising:

removing the object candidate whose size does not match the size of the virtual object from further processing.

* * * * *